United States Patent
Stolbikov et al.

(10) Patent No.: US 11,379,572 B2
(45) Date of Patent: Jul. 5, 2022

(54) APPARATUS, METHOD, AND PROGRAM PRODUCT FOR PROOF OF WORK BASED AUTHENTICATION

(71) Applicant: LENOVO (Singapore) PTE. LTD., New Tech Park (SG)

(72) Inventors: Igor Stolbikov, Apex, NC (US); Joseph M. Pennisi, Apex, NC (US); Joshua N. Novak, Wake Forest, NC (US); Philip Lee Childs, Fort Wayne, IN (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 228 days.

(21) Appl. No.: 16/555,662

(22) Filed: Aug. 29, 2019

(65) Prior Publication Data
US 2021/0064733 A1 Mar. 4, 2021

(51) Int. Cl.
*H04L 29/06* (2006.01)
*G06F 21/44* (2013.01)

(52) U.S. Cl.
CPC .................................. *G06F 21/44* (2013.01)

(58) Field of Classification Search
CPC ...... H04L 2209/38; H04L 63/12; G06F 21/64
See application file for complete search history.

(56) References Cited

U.S. PATENT DOCUMENTS

| | | | |
|---|---|---|---|
| 9,807,092 B1 * | 10/2017 | Gutzmann | H04L 63/10 |
| 9,906,552 B1 * | 2/2018 | Brown | H04L 63/1458 |
| 10,887,107 B1 * | 1/2021 | Chan | H04L 9/3236 |
| 2020/0117585 A1 * | 4/2020 | Falk | G06Q 20/065 |
| 2021/0058379 A1 * | 2/2021 | Bursell | H04L 9/14 |

* cited by examiner

*Primary Examiner* — Jason K Gee
(74) *Attorney, Agent, or Firm* — Kunzler Bean & Adamson (57) ABSTRACT

Apparatuses, methods, and program products are disclosed for proof of work based authentication. One apparatus includes a processor and a memory that stores code executable by the processor. The code is executable by the processor to determine, by use of the processor, a set of computer-based attributes corresponding to a first device. The code is executable by the processor to compute a proof of work based on the set of computer-based attributes. The code is executable by the processor to transmit the proof of work and the set of computer-based attributes to a second device for authentication based on the proof of work and the set of computer-based attributes.

17 Claims, 6 Drawing Sheets

APPARATUS, METHOD, AND PROGRAM PRODUCT FOR PROOF OF WORK BASED AUTHENTICATION

FIELD

The subject matter disclosed herein relates to security and more particularly relates to proof of work based authentication.

BACKGROUND

Description of the Related Art

Information handling devices, such as desktop computers, laptop computers, tablet computers, smart phones, optical head-mounted display units, smart watches, televisions, streaming devices, etc., are ubiquitous in society. These information handling devices may be used for performing various actions. Authentication may be requested by an information handling device. The authentication information may be duplicated by another device to improperly access information.

BRIEF SUMMARY

An apparatus for proof of work based authentication is disclosed. A method and computer program product also perform the functions of the apparatus. In one embodiment, the apparatus includes a processor and a memory that stores code executable by the processor. The code, in various embodiments, is executable by the processor to determine, by use of the processor, a set of computer-based attributes corresponding to a first device. The code, in certain embodiments, is executable by the processor to compute a proof of work based on the set of computer-based attributes. The code, in some embodiments, is executable by the processor to transmit the proof of work and the set of computer-based attributes to a second device for authentication based on the proof of work and the set of computer-based attributes.

In some embodiments, the set of computer-based attributes includes at least one computer hardware attribute, at least one computer software attribute, or a combination thereof. In one embodiment, the at least one computer hardware attribute includes a component model number, a component serial number, a component identifier, a component type, a number of components of the component type, or some combination thereof. In various embodiments, the at least one computer software attribute includes a software application name, a software application certificate, a software application license, a software application version, a software application identifier, a type of software application, a number of software applications of the type of software application, or some combination thereof. In some embodiments, the code executable by the processor computes the proof of work based on the set of computer-based attributes by using a hashing algorithm to compute the proof of work. In certain embodiments, the code executable by the processor transmits a message counter with the proof of work and the set of computer-based attributes.

A method for proof of work based authentication, in one embodiment, includes determining, by use of a processor, a set of computer-based attributes corresponding to a first device. In certain embodiments, the method includes computing a proof of work based on the set of computer-based attributes. In some embodiments, the method includes transmitting the proof of work and the set of computer-based attributes to a second device for authentication based on the proof of work and the set of computer-based attributes.

In some embodiments, the set of computer-based attributes includes at least one computer hardware attribute, at least one computer software attribute, or a combination thereof. In various embodiments, the at least one computer hardware attribute includes a component model number, a component serial number, a component identifier, a component type, a number of components of the component type, or some combination thereof. In one embodiment, the at least one computer software attribute includes a software application name, a software application certificate, a software application license, a software application version, a software application identifier, a type of software application, a number of software applications of the type of software application, or some combination thereof. In some embodiments, computing the proof of work based on the set of computer-based attributes includes using a hashing algorithm to compute the proof of work. In certain embodiments, the method includes determining an encryption key.

In some embodiments, the encryption key is determined based on the set of computer-based attributes. In various embodiments, the method includes encrypting the proof of work and the set of computer-based attributes using the encryption key prior to transmitting the proof of work and the set of computer-based attributes to the second device. In certain embodiments, the method includes transmitting a message counter with the proof of work and the set of computer-based attributes.

In one embodiment, a program product includes a computer readable storage medium that stores code executable by a processor. The executable code, in certain embodiments, includes code to perform determining, by use of the processor, a set of computer-based attributes corresponding to a first device. The executable code, in various embodiments, includes code to perform computing a proof of work based on the set of computer-based attributes. The executable code, in some embodiments, includes code to perform transmitting the proof of work and the set of computer-based attributes to a second device for authentication based on the proof of work and the set of computer-based attributes.

In certain embodiments, the set of computer-based attributes includes at least one computer hardware attribute, at least one computer software attribute, or a combination thereof. In one embodiment, the executable code includes code to perform determining an encryption key. In certain embodiments, the encryption key is determined based on the set of computer-based attributes. In various embodiments, the executable code includes code to perform encrypting the proof of work and the set of computer-based attributes using the encryption key prior to transmitting the proof of work and the set of computer-based attributes to the second device.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification have been labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
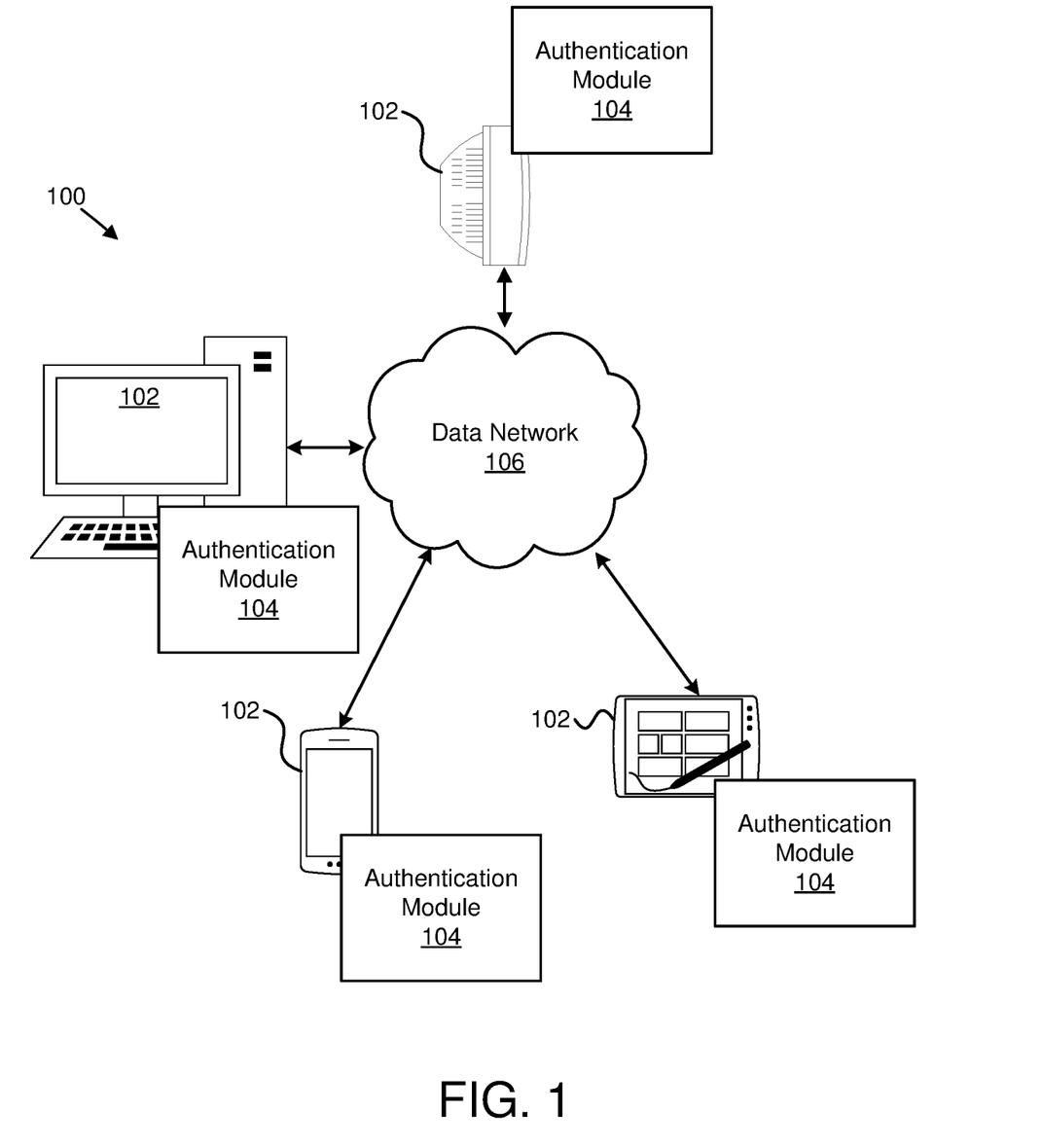
FIG. 1 is a schematic block diagram illustrating one embodiment of a system for proof of work based authentication.

FIG. 1 depicts one embodiment of a system 100 for proof of work based authentication. In one embodiment, the system 100 includes information handling devices 102, authentication modules 104, and data networks 106. Even though a specific number of information handling devices 102, authentication modules 104, and data networks 106 are depicted in FIG. 1, one of skill in the art will recognize that any number of information handling devices 102, authentication modules 104, and data networks 106 may be included in the system 100.

In one embodiment, the information handling devices 102 include computing devices, such as desktop computers, laptop computers, personal digital assistants (PDAs), tablet computers, smart phones, cellular phones, smart televisions (e.g., televisions connected to the Internet), set-top boxes, game consoles, security systems (including security cameras), vehicle on-board computers, network devices (e.g., routers, switches, modems), streaming devices, or the like. In some embodiments, the information handling devices 102 include wearable devices, such as smart watches, fitness bands, optical head-mounted displays, or the like. The information handling devices 102 may access the data network 106 directly using a network connection.

The information handling devices 102 may include an embodiment of the authentication module 104. In certain embodiments, the authentication module 104 may determine, by use of the processor, a set of computer-based attributes corresponding to a first device. The authentication module 104 may also compute a proof of work based on the set of computer-based attributes. The authentication module 104 may transmit the proof of work and the set of computer-based attributes to a second device for authentication based on the proof of work and the set of computer-based attributes. In this manner, the authentication module 104 may be used for proof of work based authentication.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication ("NFC") network, an ad hoc network, and/or the like. The data network 106 may include a WAN, a storage area network ("SAN"), a LAN, an optical fiber network, the internet, or other digital communication network. The data network 106 may include two or more networks. The data network 106 may include one or more servers, routers, switches, and/or other networking equipment. The data network 106 may also include computer readable storage media, such as a hard disk drive, an optical drive, non-volatile memory, RAM, or the like.

Figure 2:
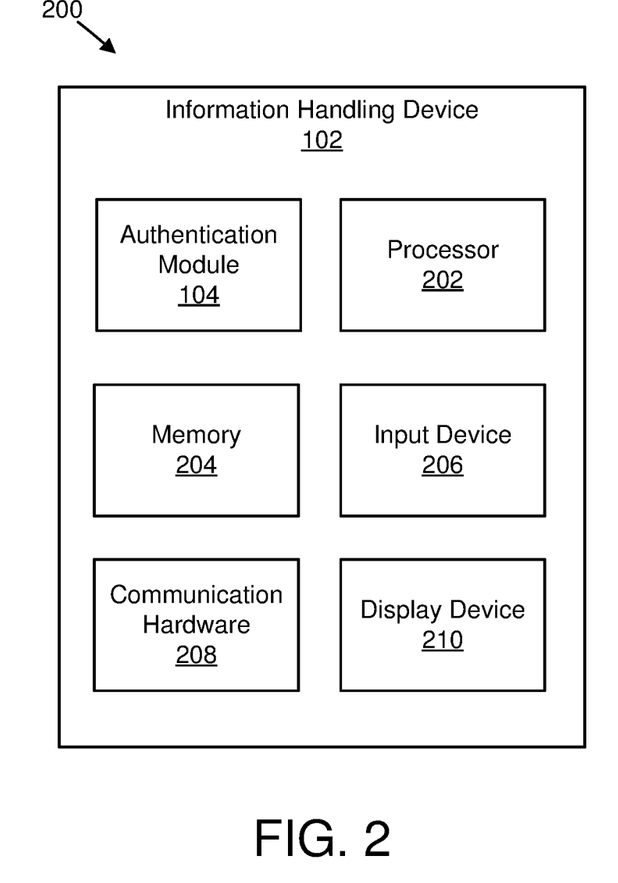
FIG. 2 is a schematic block diagram illustrating one embodiment of an apparatus including an information handling device.

FIG. 2 depicts one embodiment of an apparatus 200 that may be used for proof of work based authentication. The apparatus 200 includes one embodiment of the information handling device 102. Furthermore, the information handling device 102 may include the authentication module 104, a processor 202, a memory 204, an input device 206, communication hardware 208, and a display device 210. In some embodiments, the input device 206 and the display device 210 are combined into a single device, such as a touchscreen.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the authentication module 104, the input device 206, the communication hardware 208, and the display device 210.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media.

In some embodiments, the memory 204 stores file and/or data relating to authentication. In some embodiments, the memory 204 also stores program code and related data, such as an operating system or other controller algorithms operating on the information handling device 102.

The information handling device 102 may use the authentication module 104 for proof of work based authentication. As may be appreciated, the authentication module 104 may include computer hardware, computer software, or a combination of both computer hardware and computer software. For example, the authentication module 104 may include circuitry, or the processor 202, used to determine, by use of the processor 202, a set of computer-based attributes corresponding to a first device. As another example, the authentication module 104 may include computer program code that computes a proof of work based on the set of computer-based attributes. As a further example, the authentication module 104 may include computer program code that transmits the proof of work and the set of computer-based attributes to a second device for authentication based on the proof of work and the set of computer-based attributes.

The input device 206, in one embodiment, may include any known computer input device including a touch panel, a button, a keyboard, a stylus, or the like. In some embodiments, the input device 206 may be integrated with the display device 210, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel. The communication hardware 208 may facilitate communication with other devices. For example, the communication hardware 208 may enable communication via Bluetooth®, Wi-Fi, and so forth.

The display device 210, in one embodiment, may include any known electronically controllable display or display device. The display device 210 may be designed to output visual, audible, and/or haptic signals. In some embodiments, the display device 210 includes an electronic display capable of outputting visual data to a user. For example, the display device 210 may include, but is not limited to, an LCD display, an LED display, an OLED display, a projector, or similar display device capable of outputting images, text, or the like to a user. As another, non-limiting, example, the display device 210 may include a wearable display such as a smart watch, smart glasses, a heads-up display, or the like. Further, the display device 210 may be a component of a smart phone, a personal digital assistant, a television, a table computer, a notebook (laptop) computer, a personal computer, a vehicle dashboard, a streaming device, or the like.

In certain embodiments, the display device 210 includes one or more speakers for producing sound. For example, the display device 210 may produce an audible alert or notification (e.g., a beep or chime). In some embodiments, the display device 210 includes one or more haptic devices for producing vibrations, motion, or other haptic feedback. For example, the display device 210 may produce haptic feedback upon performing an action.

In some embodiments, all or portions of the display device 210 may be integrated with the input device 206. For example, the input device 206 and display device 210 may form a touchscreen or similar touch-sensitive display. In other embodiments, the display device 210 may be located near the input device 206. In certain embodiments, the display device 210 may receive instructions and/or data for output from the processor 202 and/or the authentication module 104.

In some embodiments, a problem with cloud services exists because the cloud services make their interfaces and APIs available to the public internet to provide services. Because cloud services are available on the public internet, the cloud services may be exposed to potential malicious activities. In certain embodiments, it may be difficult to provide user authentication that is secure, and it may be difficult to protect against denial-of-service attacks. In some circumstances, malicious actors may overload servers with traffic. Described herein are various embodiments that use a proof of work technique to provide more secure authentication and/or to protect against denial-of-service attacks.

Figure 3:
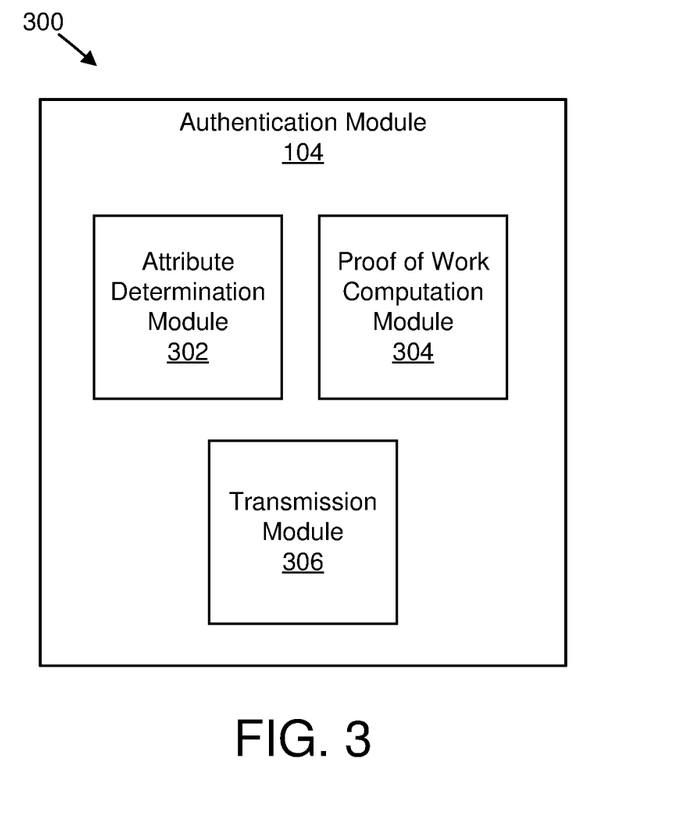
FIG. 3 is a schematic block diagram illustrating one embodiment of an apparatus including an authentication module.

FIG. 3 depicts a schematic block diagram illustrating one embodiment of an apparatus 300 that includes one embodiment of the authentication module 104. Furthermore, the authentication module 104 includes an attribute determination module 302, a proof of work computation module 304, and a transmission module 306.

In certain embodiments, the attribute determination module 302 may determine (e.g., collect), by use of the processor, a set of computer-based attributes corresponding to a first device. The first device may be a device (e.g., a client device, information handling device 102) that is used to access cloud services and/or a website. The set of computer-based attributes may include at least one computer hardware attribute and/or at least one computer software attribute. Moreover, the at least one computer hardware attribute may include a component model number, a component serial number, a component identifier, a component type, and/or a number of components of the component type, for example. Furthermore, the at least one computer hardware attribute may include a device model number, a device serial number, a device identifier, a device type, and/or a number of devices of the device type, for example. Some examples of computer hardware attributes may include: a type of memory device, an amount of memory, a serial number of a memory device, a solid state drive, a solid state device, a universally unique identifier, a medium access control address, a trusted platform module endorsement key, and so forth.

The at least one computer software attribute may include a software application name, a software application certificate (e.g., signing certificate), a software application license (e.g., license hash), a software application version, a software application identifier, a type of software application, and/or a number of software applications of the type of software application, for example.

In one embodiment, the proof of work computation module 304 may compute a proof of work based on the set of computer-based attributes. For example, the proof of work computation module 304 may compute the proof of work using an entire set of computer-based attributes as inputs into an algorithm used to compute the proof of work. As used herein, a proof of work may be a result from a proof of work system or a proof of work algorithm. The proof of work may be an answer to a mathematical problem that requires a considerable amount of work to arrive at but may be easily verified to be correct. Therefore, a computer that computes the proof of work may do so with a considerable amount of work (e.g., a high cost in the form of processor and/or memory consumption), and a server that receives the proof of work may verify the proof of work easily. As may be appreciated, if a computer was to attempt a large number of proof of work computations, the computer may not easily do this. Accordingly, bad actors may have a hard time providing a large number of proof of work computations to a server to perform a denial of service attack because of the computation power and/or time required.

In various embodiments of a proof of work system, a random process with a low probability is used so that a lot of trial and error is required on average before a valid proof of work is generated. In one embodiment of a proof of work system, a repeated, iterative calculation is made until a value with a required characteristic is calculated (e.g., a number of leading zeros in a resultant value). In some embodiments, computing a proof of work may use a hashing algorithm to compute the proof of work based on the set of computer-based attributes. There may be a number of methods used to calculate the proof of work that may be used individually and/or together, such as the following functions: integer square root modulo a large prime, weaken flat-Shamir signatures, Ong-Schnorr-Shamir signature, partial hash inversion, hash sequences, puzzles, Diffie-Hellman-based puzzle, moderate, Mbound, Hokkaido, Cuckoo cycle, Merkle tree based, guided tour puzzle protocol, secure hash algorithm 256 ("SHA-256"), scrypt, Blake-256, Crypto-Night, HEFTY1, Quark, SHA-3, scrypt Jane, scrypt-n, Adam Back HashCash, Argon2d, and so forth.

In some embodiments, a hashing algorithm is a cryptographic mathematical algorithm that maps data of arbitrary size to a hash of a fixed size. It may be designed to be a one-way function that may be impossible to invert. In certain embodiments, Argon2 may be a key derivation function that maximizes resistance to general processing unit ("GPU") cracking attacks. In one embodiment, Argon2d may access a memory array in a password dependent order which reduces a possibility of time-memory trade-off attacks, but may introduce possible side-channel attacks. In another embodiment, Argon 2i may be optimized to resist side-channel attacks and may access a memory array in a password independent order. In various embodiments, Argon2id may be a hybrid version that follows the Argon2i approach for a first pass over memory and the Argon2d approach for subsequent passes. In some embodiments, all different versions of Argon2 may allow three parameters that control: execution time; memory required; and/or degree of parallelism.

In various embodiments, Merkle tree or hash tree may be a tree in which every leaf node is labeled with a hash of a data block, and every non-leaf node is labeled with a cryptographic hash of the labels of its child nodes. Hash trees may enable efficient and/or secure verification of the contents of large data structures and may be a generalization of hash lists or hash chains. In certain embodiments, a Merkle Tree Proof ("MTP") may combine Merkle Tree hashing with iterative hashing operations.

In some embodiments, a key derivation function ("KDF") may be a crypto algorithm that derives a key from an initial master secret or password or passphrase. KDF functions may be used to stretch keys into longer keys or obtain keys of a required format. A KDF may have the properties of the protection of an initial secret through a number of repeated crypto operations to impose a cost on an attacker. KDF functions may include PBKDF2, scrypt, bcrypt, and Argon2.

In various embodiments, message signing may use public and/or private key encryption on a hash value to ensure a message integrity and an identity of a message signing party. Certain message signing algorithms may include RSA-PKCS#1, HMAC-SHA256, and/or ECDSA.

One example of a proof of work is as follows: For this example, we start with a base string for which work is performed. The base string is "Hello, world!". The target resulting proof of work is a variation of "Hello, world!" that SHA-256 hashes to a value smaller than $2^{240}$. The work is performed by varying the string "Hello, world!" by adding an integer value to the end. The integer value is called a nonce and is incremented with each iteration, then the hash result is interpreted as a long integer to determine whether it is smaller than the target of $2^{240}$. In this example, the iteration is run 4251 times to reach the result as shown in Table 1.

TABLE 1

| Iterations | | |
|---|---|---|
| Iteration String | Result | Long Integer |
| "Hello, world!0" | 1312af178c253f84028d480a6adc1e25e81caa44c749ec81976192e2ec934c64 | $2^{252}.253458683$ |
| "Hello, world!1" | e9afc424b79e4f6ab42d99c81156d3a17228d6e1eef4139be78e948a9332a7d8 | $2^{255}.868431117$ |
| "Hello, world!2" | ae37343a357a8297591625e7134cbea22f5928be8ca2a32aa475cf05fd4266b7 | $2^{255}.444730341$ |
| "Hello, world!4248" | 6e110d98b388e77e9c6f042ac6b497cec46660deef75a55ebc7cfdf65cc0b965 | $2^{254}.782233115$ |
| "Hello, world!4249" | c004190b822f1669cac8dc37e761cb73652e7832fb814565702245cf26ebb9e6 | $2^{255}.585082774$ |

TABLE 1-continued

Iterations

| Iteration String | Result | Long Integer |
|---|---|---|
| "Hello, world!4250" | 0000c3af42fc31103f1fdc0151fa747ff87349a4714df7cc52ea464e12dcd4e9 | 2^239.61238653 |

While the example iterations shown in Table 1 required 4251 hashes to complete on the client side, a server may verify the hash using the input and the hashing scheme using a single iteration.

As described herein, the proof of work is determined using the set of computer-based attributes. If nothing changes in the set of computer-based attributes, the proof of work can be reused after it is calculated because it would result in the same proof of work. In some embodiments, the proof of work may only be used a limited number of times before it is required to be recalculated. As may be appreciated, if something changes in the set of computer-based attributes, the proof of work will need to be recalculated.

In various embodiments, the transmission module 306 may transmit the proof of work and the set of computer-based attributes to a second device (e.g., a server device, information handling device 102) for authentication based on the proof of work and the set of computer-based attributes. The second device may verify the proof of work using the set of computer-based attributes and other data, such as a nonce and/or an iteration number. The verification process may be performed by the second device in a single iteration. In some embodiments, the proof of work and the set of computer-based attributes may be encrypted before being transmitted to the second device, as explained in greater detail in relation to FIG. 4. In certain embodiments, the transmission module 306 may transmit a message counter (or a timestamp) with the proof of work and the set of computer-based attributes. The message counter (or timestamp) may be an additional verification data point used to verify the authenticity of the message transmitted because the receiving device (e.g., second device) may track the message counter (or timestamp) and only authenticate messages that are in sequence with the message counter (or timestamp). In some embodiments, the message counter or timestamp may be used for replay protection.

In certain embodiments, the second device may validate the set of computer-based attributes by validating certain devices and/or application attributes used to determine the proof of work. For example, the second device may validate that: a medium access control address matches a manufacturing database, an application database, and/or a signing certificate.

Figure 4:
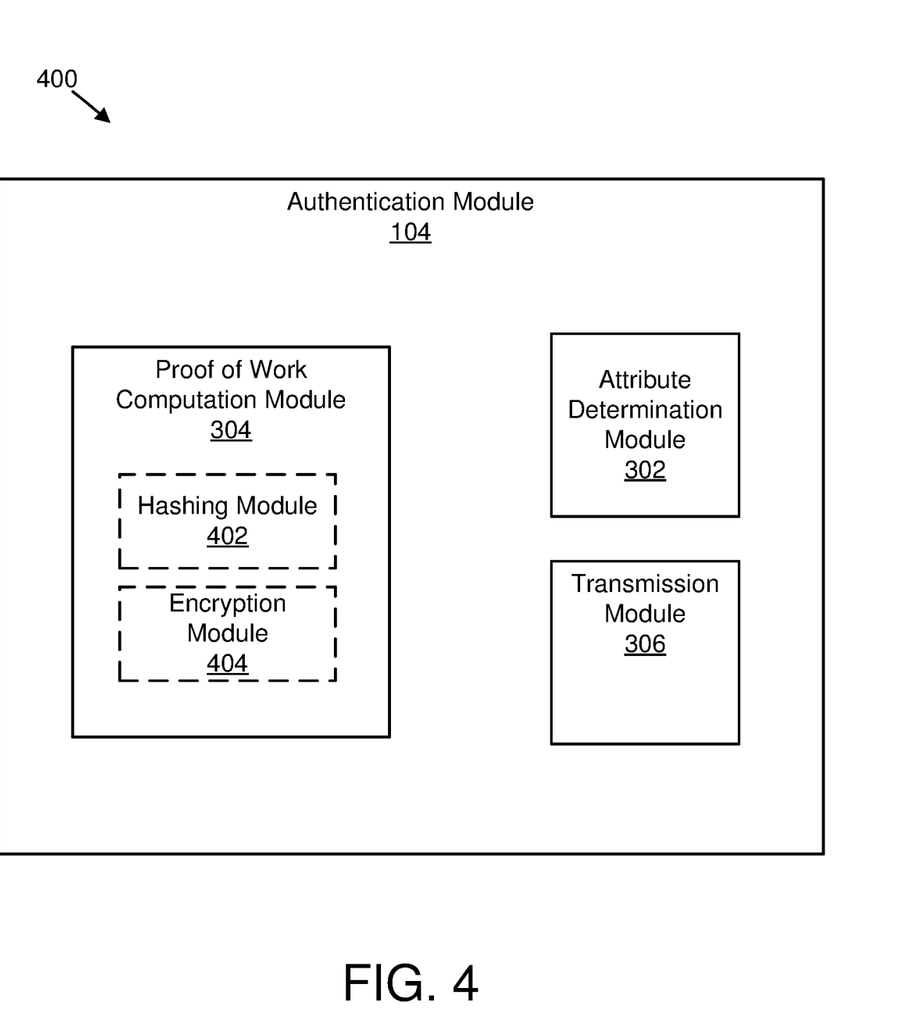
FIG. 4 is a schematic block diagram illustrating another embodiment of an apparatus including an authentication module.

FIG. 4 is a schematic block diagram illustrating another embodiment of an apparatus 400 that includes one embodiment of the authentication module 104. Furthermore, the authentication module 104 includes one embodiment of the attribute determination module 302, the proof of work computation module 304, and the transmission module 306, that may be substantially similar to the attribute determination module 302, the proof of work computation module 304, and the transmission module 306 described in relation to FIG. 3. The proof of work computation module 304 optionally includes a hashing module 402 and/or an encryption module 404.

The hashing module 402 may use a hashing algorithm to compute the proof of work based on a set of computer-based attributes. The hashing algorithm may be any of the algorithms described herein, such as one or more of the following: integer square root modulo a large prime, weaken flat-Shamir signatures, Ong-Schnorr-Shamir signature, partial hash inversion, hash sequences, puzzles, Diffie-Hellman-based puzzle, moderate, Mbound, Hokkaido, Cuckoo cycle, Merkle tree based, guided tour puzzle protocol, secure hash algorithm 256 ("SHA-256"), scrypt, Blake-256, CryptoNight, HEFTY1, Quark, SHA-3, scrypt Jane, scrypt-n, Adam Back HashCash, Argon2d, and so forth.

The encryption module 404 may determine an encryption key. In some embodiments, the encryption key may be an error correction code ("ECC") based public key and/or an ECC based private key. In other embodiments, the encryption key may be any suitable public key and/or private key. In certain embodiments, the encryption key may be generated (e.g., determined) using (e.g., based on) the computer-based attributes. In some embodiments, the encryption key may be transmitted with the computer-based attributes. In certain embodiments, the encryption key may be transmitted separate from the computer-based attributes and/or in an out of band mechanism so that the encryption key is not intercepted with the computer-based attributes. The client and/or the server may store the encryption key securely to protect the encryption key from being taken.

In various embodiments, the proof of work and/or the set of computer-based attributes may be encrypted using the encryption key prior to transmission of the proof of work and the set of computer-based attributes to the second device. In some embodiments, the proof of work may be sent to the second device as part of a message signing protocol.

Figure 5:
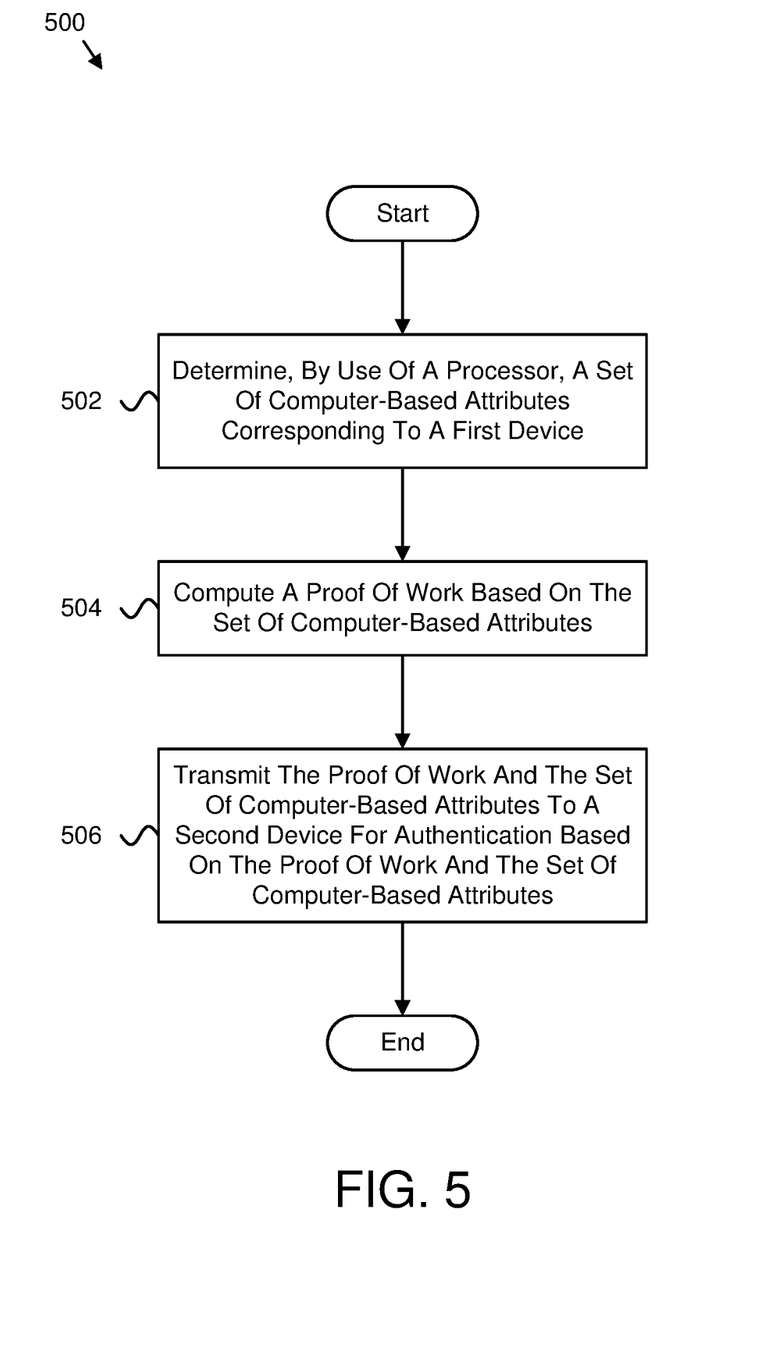
FIG. 5 is a schematic flow chart diagram illustrating an embodiment of a method for proof of work based authentication.

FIG. 5 is a schematic flow chart diagram illustrating an embodiment of a method 500 for proof of work based authentication. In some embodiments, the method 500 is performed by an apparatus, such as the information handling device 102. In other embodiments, the method 500 may be performed by a module, such as the authentication module 104. In certain embodiments, the method 500 may be performed by a processor executing program code, for example, a microcontroller, a microprocessor, a CPU, a GPU, an auxiliary processing unit, a FPGA, or the like.

The method 500 may include determining 502, by use of a processor (e.g., the processor 202), a set of computer-based attributes corresponding to a first device. In certain embodiments, the attribute determination module 302 may determine 502 the set of computer-based attributes corresponding to the first device. In some embodiments, the set of computer-based attributes includes at least one computer hardware attribute, at least one computer software attribute, or a combination thereof. In various embodiments, the at least one computer hardware attribute includes a component model number, a component serial number, a component identifier, a component type, a number of components of the component type, or some combination thereof. In certain embodiments, the at least one computer software attribute includes a software application name, a software application certificate, a software application license, a software application version, a software application identifier, a type of software application, a number of software applications of the type of software application, or some combination thereof.

The method 500 may include computing 504 a proof of work based on the set of computer-based attributes. In some embodiments, the proof of work computation module 304 may compute 504 the proof of work based on the set of computer-based attributes. In various embodiments, computing 504 the proof of work based on the set of computer-based attributes includes using a hashing algorithm to compute 504 the proof of work.

The method 500 may include transmitting 506 the proof of work and the set of computer-based attributes to a second device for authentication based on the proof of work and the set of computer-based attributes, and the method 500 may end. In some embodiments, the transmission module 306 may transmit 506 the proof of work and the set of computer-based attributes to the second device for authentication based on the proof of work and the set of computer-based attributes. In various embodiments, the method 500 may include transmitting a message counter with the proof of work and the set of computer-based attributes.

Figure 6:
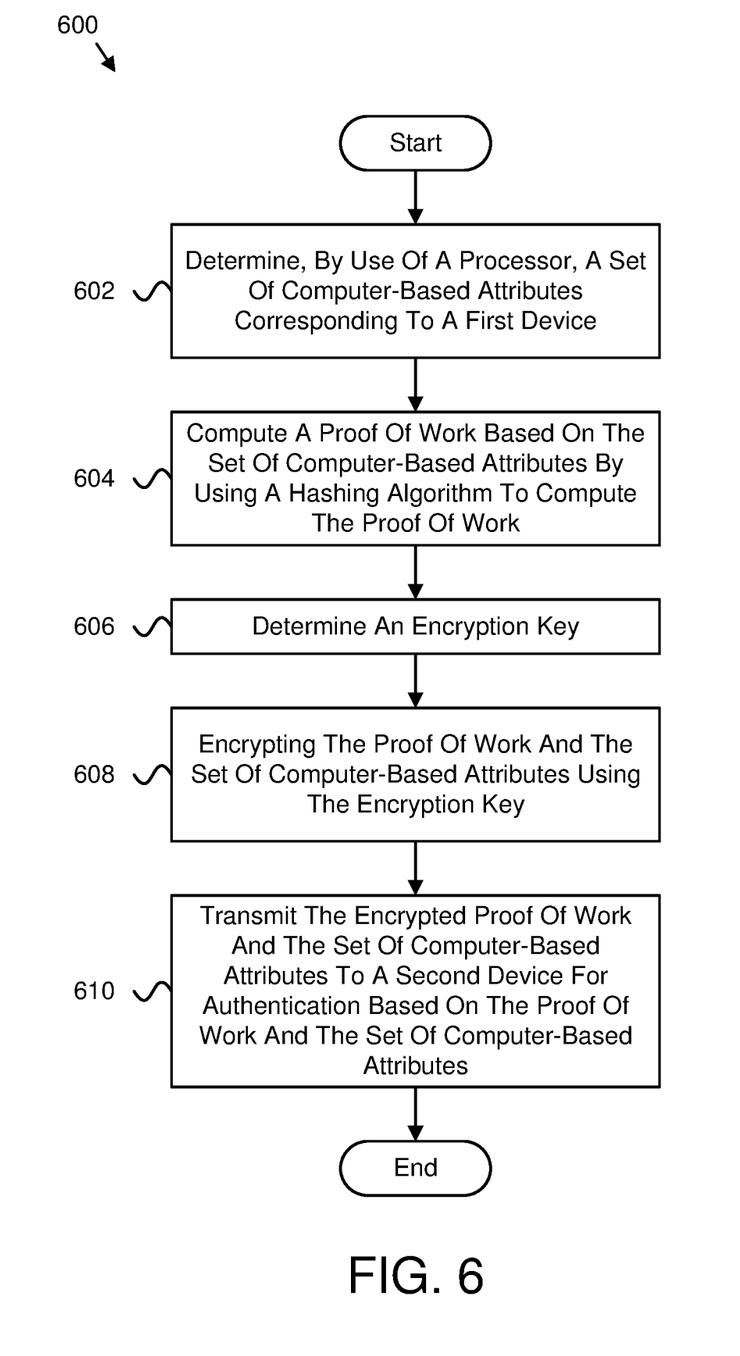
FIG. 6 is a schematic flow chart diagram illustrating another embodiment of a method for proof of work based authentication.

FIG. 6 is a schematic flow chart diagram illustrating another embodiment of a method 600 for proof of work based authentication. In some embodiments, the method 600 is performed by an apparatus, such as the information handling device 102. In other embodiments, the method 600 may be performed by a module, such as the authentication module 104. In certain embodiments, the method 600 may be performed by a processor executing program code, for example, a microcontroller, a microprocessor, a CPU, a GPU, an auxiliary processing unit, a FPGA, or the like.

The method 600 may include determining 602, by use of a processor (e.g., the processor 202), a set of computer-based attributes corresponding to a first device. In certain embodiments, the attribute determination module 302 may determine 602 the set of computer-based attributes corresponding to the first device. In some embodiments, the set of computer-based attributes includes at least one computer hardware attribute, at least one computer software attribute, or a combination thereof. In various embodiments, the at least one computer hardware attribute includes a component model number, a component serial number, a component identifier, a component type, a number of components of the component type, or some combination thereof. In certain embodiments, the at least one computer software attribute includes a software application name, a software application certificate, a software application license, a software application version, a software application identifier, a type of software application, a number of software applications of the type of software application, or some combination thereof.

The method 600 may include computing 604 a proof of work based on the set of computer-based attributes by using a hashing algorithm (e.g., using the hashing module 402) to compute the proof of work. In some embodiments, the proof of work computation module 304 may compute 604 the proof of work based on the set of computer-based attributes by using the hashing algorithm to compute the proof of work.

The method 600 may include determining 606 an encryption key. In certain embodiments, the encryption module 404 may determine 606 the encryption key. In various embodiments, the encryption key is determined based on the set of computer-based attributes.

The method 600 may include encrypting 608 the proof of work and the set of computer-based attributes using the encryption key prior to transmitting the proof of work and the set of computer-based attributes to a second device. In some embodiments, the encryption module 404 may encrypt 608 the proof of work and the set of computer-based attributes using the encryption key prior to transmitting the proof of work and the set of computer-based attributes to the second device.

The method 600 may include transmitting 610 the encrypted proof of work and the set of computer-based attributes to the second device for authentication based on the proof of work and the set of computer-based attributes, and the method 600 may end. In some embodiments, the transmission module 306 may transmit 610 the proof of work and the set of computer-based attributes to the second device for authentication based on the proof of work and the set of computer-based attributes. In various embodiments, the method 600 may include transmitting a message counter with the proof of work and the set of computer-based attributes.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising a first device, the apparatus further comprising:
   a processor;
   a memory that stores code executable by the processor to:
      determine, by use of the processor, a set of computer-based attributes corresponding to the first device, wherein the set of computer-based attributes comprises at least one computer hardware attribute and at least one computer software attribute;
      compute a proof of work using the set of computer-based attributes as inputs into an algorithm used to compute the proof of work;
      transmit the proof of work and the set of computer-based attributes to a second device for authentication based on the proof of work and the set of computer-based attributes;
      determine a change in the set of computer-based attributes; and
      compute an updated proof of work using the changed set of computer-based attributes at inputs into the algorithm used to compute the updated proof of work.

2. The apparatus of claim 1, wherein the at least one computer hardware attribute comprises a component model number, a component serial number, a component identifier, a component type, a number of components of the component type, or some combination thereof.

3. The apparatus of claim 1, wherein the at least one computer software attribute comprises a software application name, a software application certificate, a software application license, a software application version, a software application identifier, a type of software application, a number of software applications of the type of software application, or some combination thereof.

4. The apparatus of claim 1, wherein the code executable by the processor computes the proof of work based on the set of computer-based attributes by using a hashing algorithm to compute the proof of work.

5. The apparatus of claim 1, wherein the code executable by the processor transmits a message counter with the proof of work and the set of computer-based attributes.

6. A method at a first device, the method comprising:
- determining, by use of a processor, a set of computer-based attributes corresponding to the first device, wherein the set of computer-based attributes comprises at least one computer hardware attribute and at least one computer software attribute;
- computing a proof of work using the set of computer-based attributes as inputs into an algorithm used to compute the proof of work;
- transmitting the proof of work and the set of computer-based attributes to a second device for authentication based on the proof of work and the set of computer-based attributes;
- determining a change in the set of computer-based attributes; and
- computing an updated proof of work using the changed set of computer-based attributes at inputs into the algorithm used to compute the updated proof of work.

7. The method of claim 6, wherein the at least one computer hardware attribute comprises a component model number, a component serial number, a component identifier, a component type, a number of components of the component type, or some combination thereof.

8. The method of claim 6, wherein the at least one computer software attribute comprises a software application name, a software application certificate, a software application license, a software application version, a software application identifier, a type of software application, a number of software applications of the type of software application, or some combination thereof.

9. The method of claim 6, wherein computing the proof of work based on the set of computer-based attributes comprises using a hashing algorithm to compute the proof of work.

10. The method of claim 6, further comprising determining an encryption key.

11. The method of claim 10, wherein the encryption key is determined based on the set of computer-based attributes.

12. The method of claim 10, further comprising encrypting the proof of work and the set of computer-based attributes using the encryption key prior to transmitting the proof of work and the set of computer-based attributes to the second device.

13. The method of claim 6, further comprising transmitting a message counter with the proof of work and the set of computer-based attributes.

14. A program product of a first device comprising a non-transitory computer readable storage medium that stores code executable by a processor, the executable code comprising code to perform:
- determining, by use of the processor, a set of computer-based attributes corresponding to the first device, wherein the set of computer-based attributes comprises at least one computer hardware attribute and at least one computer software attribute;
- computing a proof of work using the set of computer-based attributes as inputs into an algorithm used to compute the proof of work;
- transmitting the proof of work and the set of computer-based attributes to a second device for authentication based on the proof of work and the set of computer-based attributes;
- determining a change in the set of computer-based attributes; and
- computing an updated proof of work using the changed set of computer-based attributes at inputs into the algorithm used to compute the updated proof of work.

15. The program product of claim 14, wherein the executable code comprises code to perform determining an encryption key.

16. The program product of claim 15, wherein the encryption key is determined based on the set of computer-based attributes.

17. The program product of claim 15, wherein the executable code comprises code to perform encrypting the proof of work and the set of computer-based attributes using the encryption key prior to transmitting the proof of work and the set of computer-based attributes to the second device.

* * * * *